July 10, 1962     W. J. DE LANEY     3,043,912

INTERCOM FOR AUTOMOBILES

Filed July 10, 1957

WILLIAM J. DeLANEY
INVENTOR.

BY *Herbert J. Brown*

ATTORNEY

United States Patent Office 3,043,912
Patented July 10, 1962

3,043,912
INTERCOM FOR AUTOMOBILES
William J. De Laney, 6540 Baker Blvd., Fort Worth, Tex.
Filed July 10, 1957, Ser. No. 670,979
3 Claims. (Cl. 179—1)

This invention relates to intercommunication systems for automobiles and trucks, and has reference to a speaker-microphone arrangement for audio-communication between the inside and outside of a vehicle even though the windows of the vehicle are closed.

It has long been the practice to heat the interiors of automobiles and trucks during the winter time, and which practice required keeping the vehicle windows closed. More recently, it has become the practice to equip vehicles with air conditioning systems for passenger comfort during hot weather. Occupying a vehicle with the windows closed not only presents driving hazards, such as not hearing warning signals from other vehicles, but causes inconvenience at service stations and other drive-in establishments where it is necessary to open the vehicle windows in order to talk with attendants.

An object of the invention is to increase safety when driving with vehicle windows closed; particularly, the invention is directed to an intercommunication system for vehicles capable of picking up danger signals, such as sirens, train whistles, automobile horns and other sounds.

Another object of the invention is to provide means whereby the vehicle windows may remain closed and the doors locked, such as required by women driving alone, and yet provide communication with the exterior of the vehicle.

Another object of the invention is to provide a communication system in highway patrol or police cars, and whereby an officer in the car may listen to interrogrations by another officer outside the car when stopping a traffic violator or questioning a suspect.

A further object of the invention is to provide outside communication in an automobile for a driver who is hard of hearing.

A further object of the invention is to provide outside communication means in vehicles which are necessarily closed at all times, such as armored bank cars which have bulletproof windows and steel plates.

A particular object of the invention is to provide, in a communication system of the described class, a speaker-microphone baffle box which not only protects the speaker from the weather, but one which does not distort tone qualities.

The foregoing and other objects will become apparent upon consideration of the following specification and the accompanying drawing, wherein.

Any suitable wiring for dual speaker-microphone system may be used, but it is preferred that the electrical circuits be independent of the vehicle ignition system and that transistors be used instead of conventional vacuum tubes to provide a reliable and rugged unit. The master control unit 10 is located beneath the instrument panel of the vehicle 11 within the reach of the driver, which control unit contains a speaker-microphone, not shown, and has projecting a "listen-talk" switch 12 and a volume control knob 13. It will be apparent to those versed in the art that a hearing aid may be connected in the unit 10 in such a manner that a driver who is hard of hearing may use the present intercommunication system.

Figure 1:
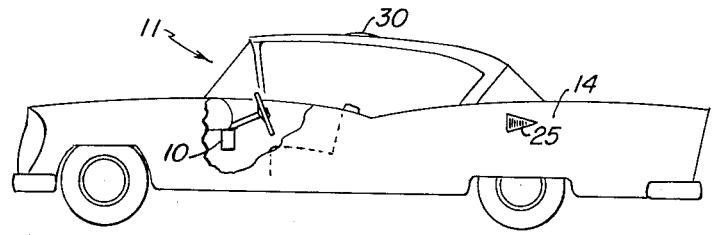
FIGURE 1 is a side elevation of an automobile showing the location of the master control unit and preferred locations of speaker-microphone units.
Figure 3:
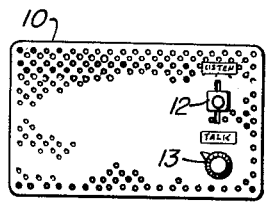
FIGURE 3 is a front elevation of the master control unit.
Figure 2:
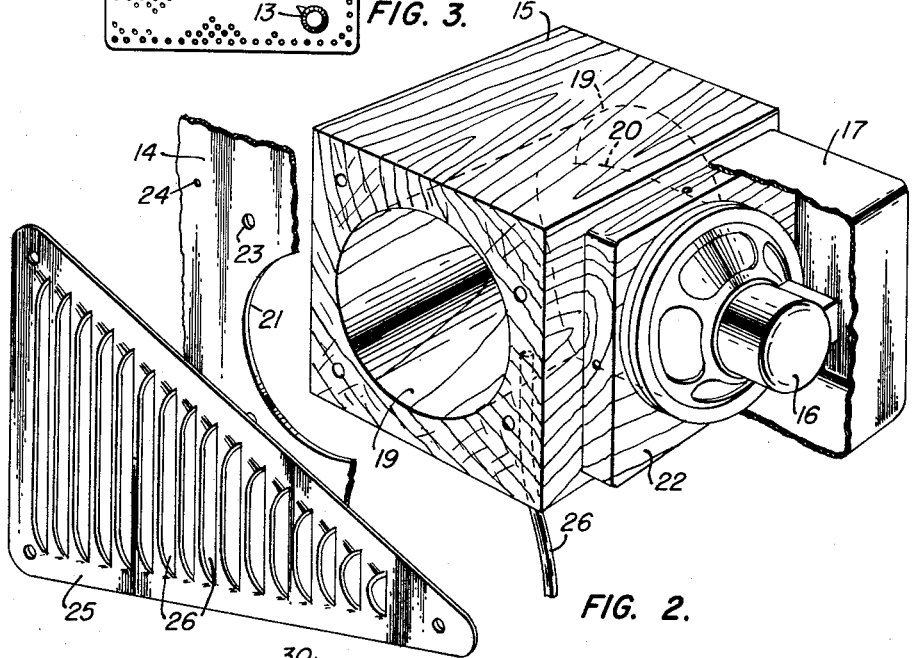
FIGURE 2 is an exploded broken perspective showing the baffle box, speaker, speaker housing, grill, and drain, comprising essential features of the invention.

An outer speaker-microphone unit, for installation in an automobile fender 14, is illustrated in FIGURE 2. The outer unit is comprised of a baffle box 15, a speaker-microphone 16, and speaker housing 17. The baffle box 15 shown is of wood but may be made of plastic (synthetic resin) or other suitable material. The passage through the box is comprised of two cylindrical recesses 19 and 20 which communicate with each other at a right angle, and the diameters of which are substantially as large as the mouth of the speaker 16. The open end of the first recess 19 is coincident with a circular opening 21 in the fender 14, whereas the open end of the second recess 20 is coincident with a circular opening, not numbered, in a speaker mounting block 22 on the surface of the baffle box 15. The speaker 16 is mounted on the periphery of the last referred to circular opening, and the speaker housing 17 is mounted over the speaker where the housing engages the edge of the mounting block 22.

Holes 23 are drilled in the fender 14 around the circular opening 21 to receive screws, not shown, for securing the baffle box 15 against the fender's inner surface, and additional holes 24 are drilled in the fender outwardly of the first said holes for securing a louvered grill 25 on the outer surface of the fender and over said circular opening. The louvers 26 of the grill 25 are vertical and are outwardly and rearwardly directed with reference to the forward direction of the vehicle 11. The lower center area of the first described cylindrical recess 19 is provided with a tube 26 for draining any water which may enter the baffle box 15 through the grill 25.

Figure 4:
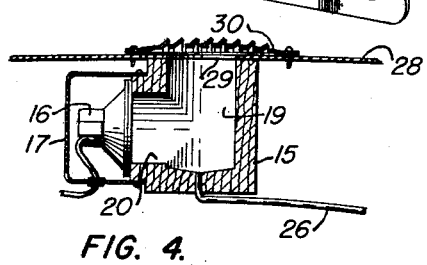
FIGURE 4 is a vertical sectional view of a modified form of the invention for installation in the roof of a vehicle.

The modified form of the invention shown in FIGURE 4 is for installation in the top 28 of a vehicle 11 and the outer cylindrical recess 19 is vertically disposed and secured around the periphery of a circular opening 29 therein. The grill 30 may be circular instead of triangular as shown in FIGURE 2, and the louvers 31 are horizontal and upwardly and rearwardly directed. In this form of the invention the drain tube 26 is in the lower end of the vertical cylindrical recess 19.

From the foregoing description it will be apparent that the driver of the vehicle may readily communicate with others outside the vehicle even through the windows are closed, and that the driver may also hear warning signals.

The invention is not limited to the exemplary construction herein shown and described, but may be made in various ways within the scope of the appended claims.

What is claimed is:

1. An intercommunication system for vehicles having closed passenger compartments, said intercommunication system comprising a control unit and a first speaker-microphone located near the driver of said vehicle, an opening in a longitudinal wall of said vehicle, a second speaker-microphone mounted in said vehicle and directed toward the rear thereof, said second speaker-microphone being located forwardly of said opening, a box mounted between said opening and said second speaker-microphone and including an audio-passage therebetween, a grill over said opening, and means including said control unit electrically connected and energizing both said speaker-microphones.

2. An intercommunication system for vehicles as defined in claim 1 and wherein said audio-passage is comprised of cylindrical recesses of uniform diameter communicating with each other at a right angle within said box.

3. An intercommunication system for vehicles as defined in claim 1 and wherein said opening is located in a side wall of said vehicle and wherein said grill includes vertical, outwardly and rearwardly directed louvers.

References Cited in the file of this patent

UNITED STATES PATENTS

| | | |
|---|---|---|
| 1,111,463 | Hutchison | Sept. 22, 1914 |
| 1,182,926 | O'Brien | May 16, 1916 |
| 1,905,215 | Cadieux | Apr. 25, 1933 |
| 2,210,477 | Benecke | Aug. 6, 1940 |
| 2,463,762 | Giannini | Mar. 8, 1949 |

FOREIGN PATENTS

| | | |
|---|---|---|
| 758,829 | France | Jan. 24, 1934 |
| 770,652 | France | Sept. 18, 1934 |